United States Patent
Oe

(10) Patent No.: US 9,735,887 B2
(45) Date of Patent: Aug. 15, 2017

(54) OPTICAL RECEPTION DEVICE AND OPTICAL RECEPTION METHOD

(71) Applicant: NEC Corporation, Tokyo (JP)

(72) Inventor: Masaki Oe, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 14/800,909

(22) Filed: Jul. 16, 2015

(65) Prior Publication Data
US 2016/0028491 A1    Jan. 28, 2016

(30) Foreign Application Priority Data

Jul. 22, 2014    (JP) .................................. 2014-148666

(51) Int. Cl.

| | |
|---|---|
| *H04B 10/64* | (2013.01) |
| *H04B 10/61* | (2013.01) |
| *H04L 7/00* | (2006.01) |
| *H04L 1/00* | (2006.01) |
| *H04L 1/20* | (2006.01) |

(52) U.S. Cl.
CPC ....... *H04B 10/6164* (2013.01); *H04L 1/0001* (2013.01); *H04L 7/0054* (2013.01); *H04L 7/0075* (2013.01); *H04L 1/20* (2013.01)

(58) Field of Classification Search
CPC .............. H04N 21/4382; H04B 1/0475; H04B 10/2914; H04B 10/61; H04J 14/02
USPC ....................................................... 398/209
See application file for complete search history.

(56) References Cited

U.S. PATENT DOCUMENTS

| | | | |
|---|---|---|---|
| 2006/0034358 A1* | 2/2006 | Okamura ................ | H04L 1/205 375/219 |
| 2006/0109940 A1* | 5/2006 | Beukema .............. | H04L 7/0058 375/350 |
| 2010/0021179 A1* | 1/2010 | Kikuchi ................ | H04B 10/61 398/183 |
| 2010/0220952 A1* | 9/2010 | Smith ................... | H01S 5/0683 385/14 |

FOREIGN PATENT DOCUMENTS

| | | |
|---|---|---|
| JP | 6-104670 | 4/1994 |
| JP | 9-261205 | 10/1997 |

* cited by examiner

*Primary Examiner* — Don N Vo
(74) *Attorney, Agent, or Firm* — Finnegan, Henderson, Farabow, Garrett & Dunner, L.L.P.

(57) ABSTRACT

An optical reception device according to an exemplary aspect of the invention includes an optical front-end means for demodulating an inputted optical signal, converting the demodulated signal into an electrical signal and outputting the electrical signal, a pre-emphasis means for adding a high frequency component to the electrical signal, a digital signal processing means for receiving input of the electrical signal with the high frequency component added thereto via a transmission wire, and for performing a digital coherent reception process on the inputted electrical signal, an error detection means for detecting a signal error in the digital coherent reception process and a feedback control means for varying the level of a high frequency component added at the pre-emphasis means and, in accordance with signal errors detected at that time, controlling the pre-emphasis means.

9 Claims, 7 Drawing Sheets

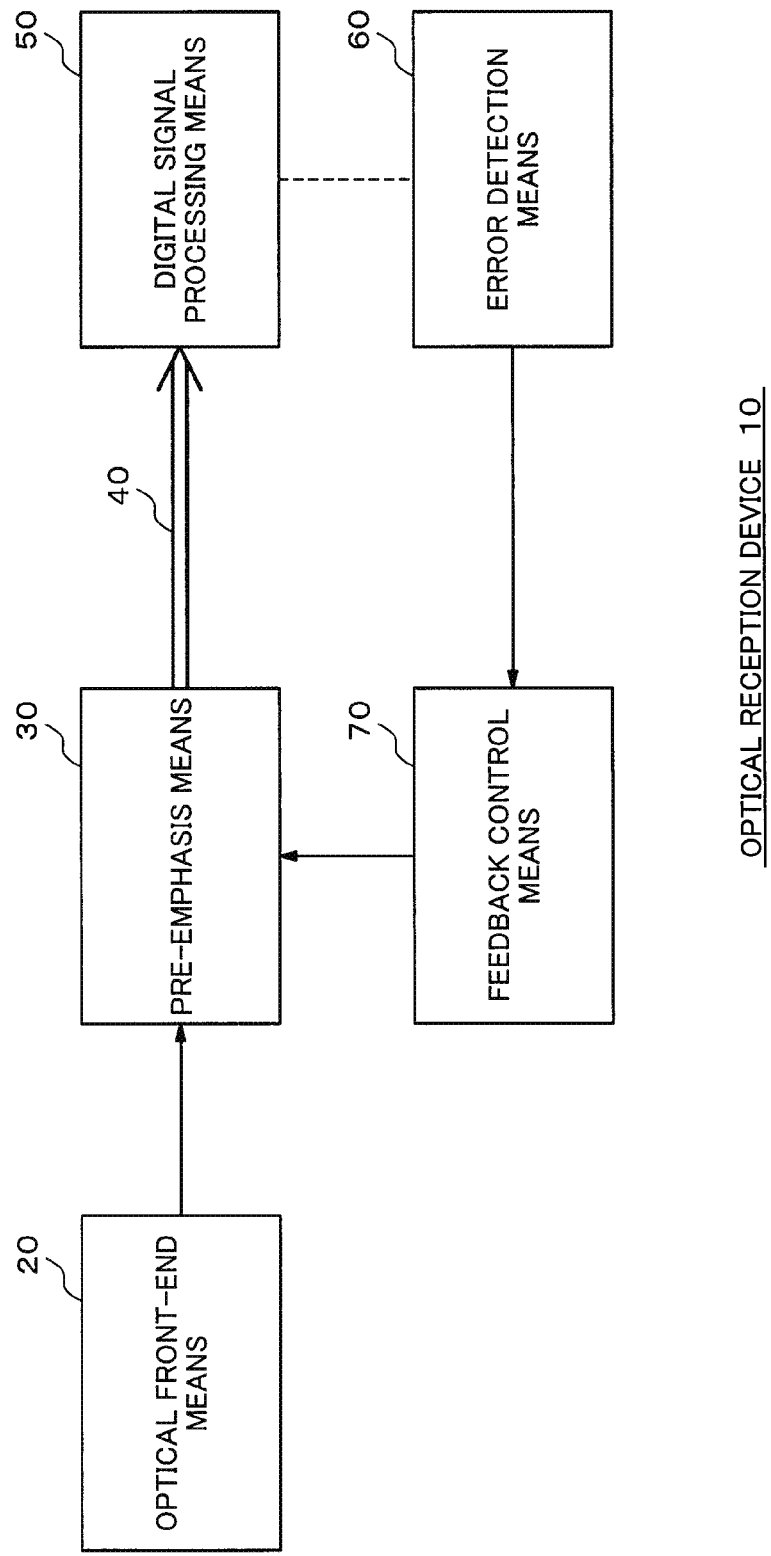

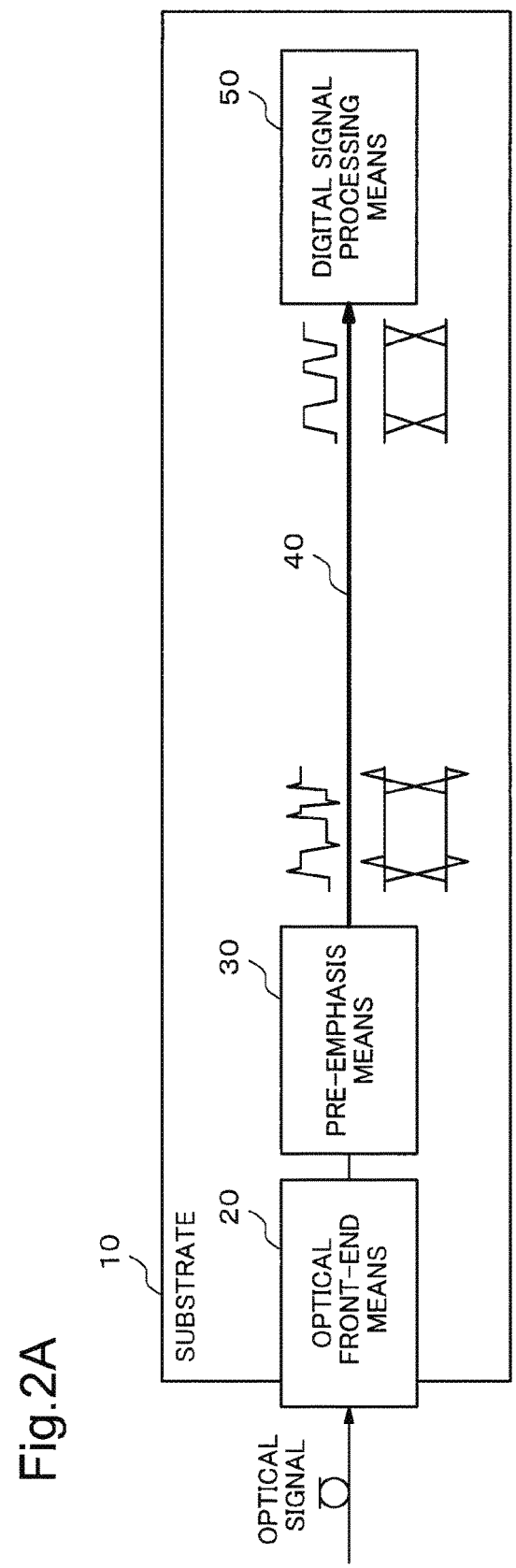

OPTICAL RECEPTION DEVICE AND OPTICAL RECEPTION METHOD

INCORPORATION BY REFERENCE

This application is based upon and claims the benefit of priority from Japanese Patent Application No. 2014-148666, filed on Jul. 22, 2014, the disclosure of which is incorporated herein in its entirety by reference.

BACKGROUND OF THE INVENTION

1. Technical Field

The present invention relates to an optical reception device and an optical reception method, both for performing a digital coherent reception process, and in particular, relates to an optical reception device having a configuration wherein an optical front-end unit formed into a pluggable module is attached, after the formation, to a digital signal processing unit, and also relates to an optical reception method using the device.

2. Background Art

In recent optical transmission systems, the amount of data transmitted through an optical transmission channel has been steadily increasing. In view of enabling to accommodate such data amount, there is strong demand for capacity increase also of optical transmission channels. As one of technologies capable of realizing such capacity increase, there is a technology of increasing the frequency utilization efficiency during wavelength multiplexed transmission by means of multi-level modulation.

In an optical transmission system of a high order multi-level modulation method, it is usual to employ a coherent detection wherein a received phase-modulated signal is detected by combining it with local oscillator light. In that case, in order to compensate for a difference between the carrier frequency of the optical signal and the frequency of the local oscillator light and for fluctuation in their phases, carrier phase estimation and compensation are performed, using digital signal processing technology, at an optical front-end unit and a digital signal processing unit. Accordingly, in an optical reception device adopted in a digital coherent optical transmission system, it has been general that an optical front-end unit and a digital signal processing unit are formed together into a single body.

A configuration being employed in recent years is that obtained by forming an optical front-end unit into a pluggable module and attaching it, after the formation, to a digital signal processing unit. However, when the two units are connected with each other by means of a transmission wire, a high frequency component of a signal is attenuated during the signal's propagating through the transmission wire, because general transmission wires function as a low pass filter.

In FIG. 6, shown is an input signal characteristic (a) at a digital signal processing unit in a case where the digital signal processing unit and an optical front-end unit are formed together into a single body. In FIG. 6, also shown is an input signal characteristic (b) at a digital signal processing unit in a case where the optical front-end unit is formed into a pluggable module and then is connected with a digital signal processing unit by means of connectors and a transmission wire of 50 mm length. Here, in the former optical reception device, the optical front-end unit and the digital signal processing unit are connected with each other by means of a transmission wire of 10 mm length. As seen from FIG. 6, a high frequency component is remarkably attenuated in the input signal characteristic (b) for when the front-end unit and the digital signal processing unit are connected with each other by means of connectors and a transmission wire, compared to the input signal characteristic (a) for when the two units are formed together into a single body. The attenuation of a high frequency component increases with increasing frequency.

As technologies for compensating for attenuation of a high frequency component, there are a technology which amplifies a high frequency component in advance at the sending side and thereby cancels out deterioration of a high-frequency signal to occur before its arrival at the receiving side (pre-emphasis), and a technology which performs, according to the characteristic of an already generated signal, feedback control of the frequency characteristic of a signal to be newly generated. For example, an optical transmission system employing pre-emphasis is disclosed in Japanese Patent Application Laid-Open No. 1997-261205 (Patent Literature 1), and an optical reception device performing feedback control of the frequency characteristic of a signal to be newly generated is disclosed in Japanese Patent Application Laid-Open No. 1994-104670 (Patent Literature 2).

SUMMARY

The present invention is aimed at, with respect to an optical reception device having a configuration wherein an optical front-end unit formed into a pluggable module is attached, after the formation, to a digital signal processing unit by the use of a connection member, providing an optical reception device capable of compensating for attenuation of a high frequency component of a signal with high accuracy, and also providing an optical reception method using the device.

An optical reception device according to an exemplary aspect of the invention includes an optical front-end means for demodulating an inputted optical signal, converting the demodulated signal into an electrical signal and outputting the electrical signal, a pre-emphasis means for adding a high frequency component to the electrical signal, a digital signal processing means for receiving input of the electrical signal with the high frequency component added thereto via a transmission wire, and for performing a digital coherent reception process on the inputted electrical signal, an error detection means for detecting a signal error in the digital coherent reception process and a feedback control means for varying the level of a high frequency component added at the pre-emphasis means and, in accordance with signal errors detected at that time, controlling the pre-emphasis means.

An optical reception method in an optical reception device according to an exemplary aspect of the invention performs demodulating an inputted optical signal, and converting the demodulated signal into an electrical signal, adding a predetermined high frequency component to the electrical signal, transmitting the electrical signal with the high frequency component added thereto, through a transmission wire, performing a digital coherent reception process on the transmitted electrical signal, detecting a signal error in the digital coherent reception process and varying the level of the high frequency component to add, and thereby controlling the high frequency component in a manner to make a detected signal error small.

An another optical reception method in an optical reception device according to an exemplary aspect of the invention performs demodulating an inputted optical signal, and converting the demodulated signal into an electrical signal, removing a predetermined low frequency component from the electrical signal, transmitting the electrical signal with the low frequency component removed therefrom, through a transmission wire, performing a digital coherent reception process on the transmitted electrical signal, detecting a signal error in the digital coherent reception process and controlling the low frequency component in a manner to make a detected signal error small.

BRIEF DESCRIPTION OF THE DRAWINGS

Exemplary features and advantages of the present invention will become apparent from the following detailed description when taken with the accompanying drawings in which:

FIG. 1 is a block configuration diagram of an optical reception device 10 according to a first exemplary embodiment;

FIG. 2A is a diagram showing change in a signal waveform in the optical reception device 10 according to the first exemplary embodiment;

EXEMPLARY EMBODIMENT

Figure 2B:
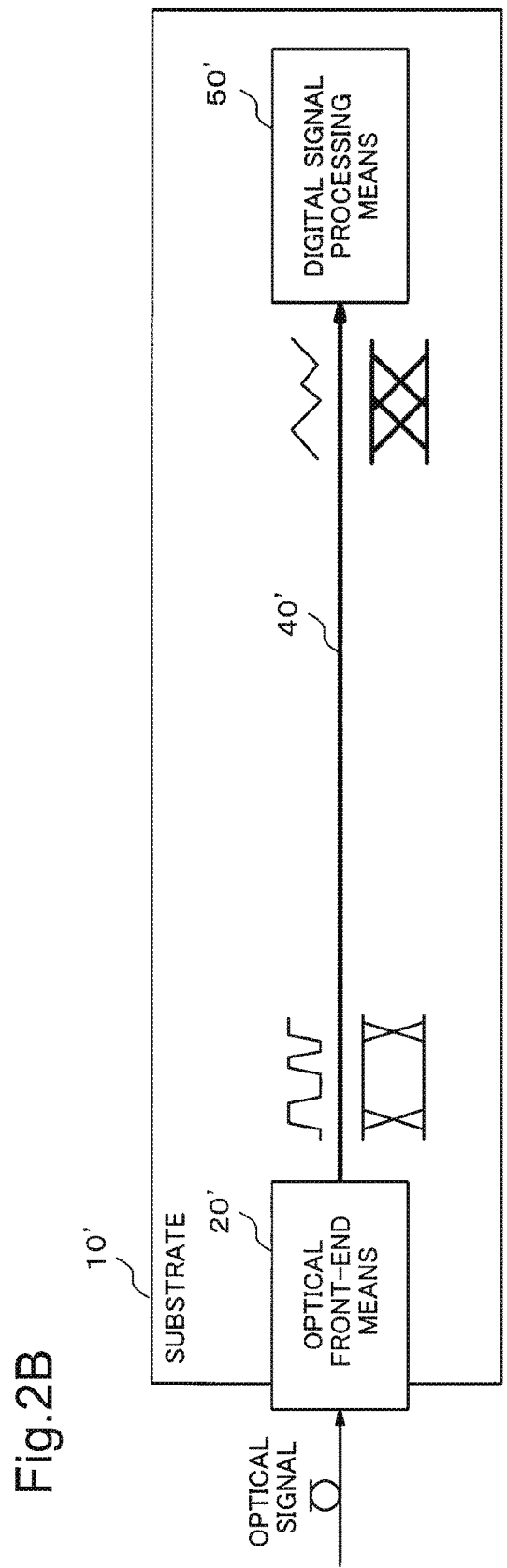
FIG. 2B is a diagram showing change in a signal waveform in an optical reception device 10' according to a comparative example.

Exemplary embodiments of the present invention will now be described in detail in accordance with the accompanying drawings.

First Exemplary Embodiment

A first exemplary embodiment of the present invention will be described below. FIG. 1 shows a block configuration diagram of an optical reception device according to the present exemplary embodiment. In FIG. 1, the optical reception device 10 comprises an optical front-end means 20, a pre-emphasis means 30, a connection means 40, a digital signal processing means 50, an error detection means 60 and a feedback control means 70.

The optical front-end means 20 demodulates an inputted optical signal, and outputs the demodulated signal after converting it into an electrical signal. The optical front-end means 20 is composed of a photodetector which detects an optical signal and converts it into an electrical signal, a trans-impedance amplifier which amplifies the converted electrical signal, and the like.

The pre-emphasis means 30 adjusts the output level, at each frequency, of the electrical signal demodulated at the optical front-end means 20, and outputs the adjusted electrical signal. In the present exemplary embodiment, the pre-emphasis means 30 increases the output level, in a high frequency range, of the electrical signal demodulated at the optical front-end means 20, by adding a predetermined high frequency component to the electrical signal. The electrical signal outputted from the pre-emphasis means 30 is inputted to the digital signal processing means 50 via the connection means 40. Here, a level of the high frequency component added to the demodulated electrical signal will be described as a pre-emphasis intensity.

The connection means 40 is composed of connectors, a transmission wire (specifically, an electrical wiring or the like) and the like, and transmits the electrical signal outputted from the pre-emphasis means 30 to the digital signal processing means 50. The transmission wire of the connection means 40 functions as a low pass filter, and accordingly, a high frequency component of the electrical signal is attenuated as a result of the electrical signal's propagating through the transmission wire.

The digital signal processing means 50 performs a digital coherent reception process on the electrical signal inputted from the optical front-end means 20 via the pre-emphasis means 30 and the connection means 40. The digital signal processing means 50 may be composed of an analog-to-digital conversion circuit which converts an inputted analog electrical signal into a digital electrical signal, a digital signal processor which performs a digital coherent reception process on the digital converted electrical signal, and the like.

The error detection means 60 monitors the digital coherent reception process performed at the digital signal processing means 50, and thereby detects a signal error in the digital coherent reception process. Because the error detection means 60 according to the present exemplary embodiment performs the signal error detection on a digital electrical signal, it can count a signal error with high accuracy.

The feedback control means 70 controls the pre-emphasis intensity of the pre-emphasis means 30, on the basis of the signal error detected at the error detection means 60. The feedback control means 70 according to the present exemplary embodiment varies the pre-emphasis intensity of the pre-emphasis means 30 in increasing and decreasing directions from an initial value set in advance, and thereby sets, to the pre-emphasis means 30, a pre-emphasis intensity yielding a minimum one of signal errors detected at the error detection means 60.

In the optical reception device 10 configured as described above, because the error detection means 60 detects a signal error in a digital coherent reception process performed on a digital electrical signal, it can count the signal error with high accuracy, and accordingly can control the pre-emphasis means 30 with high accuracy. Further, because the feedback control means 70 varies the pre-emphasis intensity of the pre-emphasis means 30 and thereby sets, to the pre-emphasis means 30, a pre-emphasis intensity yielding a minimum one of signal errors in the digital coherent reception process, it needs no complicated process.

Accordingly, even in a case where an electrical signal processed at the optical front-end means 20 and at the pre-emphasis means 30 is inputted to the digital signal processing means 50 via the connection means 40, the optical reception device 10 according to the present exemplary embodiment can compensate for attenuation of a high frequency component of the signal with high accuracy and easily, and thereby can optimally perform a digital coherent reception process.

FIG. 2A shows a change in a signal waveform, in the optical reception device 10 according to the present exemplary embodiment, when the pre-emphasis intensity of the pre-emphasis means 30 is optimally controlled by the feedback control means 70. On the other hand, as a comparative example, FIG. 2B shows a change in a signal waveform in an optical reception device 10' wherein no pre-emphasis means is arranged. In FIGS. 2A and 2B, the respective optical reception devices 10 and 10' are formed by arranging the optical front-end means 20 and 20' and the digital signal processing means 50 and 50', respectively, on a substrate, and connecting the two means by the connection means 40 and 40'. Here, in FIG. 2A, an illustration of the error detection means 60 and an illustration of the feedback control means 70 are omitted.

As shown in FIG. 2A, in the case of arranging the pre-emphasis means 30 and thereby controlling the pre-emphasis means 30 optimally by the feedback control means 70, a signal corresponding to a rectangular signal with a high frequency component added to it is outputted to the connection means 40. The signal with the additional high frequency component undergoes attenuation of the high frequency component as a result of its propagating through the connection means 40, and consequently, a high quality rectangular signal is inputted to the digital signal processing means 50. That is, by the pre-emphasis means 30 appropriately adding a high frequency component in advance, an input signal characteristic at the digital signal processing means 50 is improved.

In contrast, as shown in FIG. 2B, in the case of arranging no pre-emphasis means, a rectangular signal outputted from the optical front-end means 20' undergoes attenuation of its high frequency component as a result of its propagating through the connection means 40', and consequently, a deteriorated signal is inputted to the digital signal processing means 50'.

Figure 3:
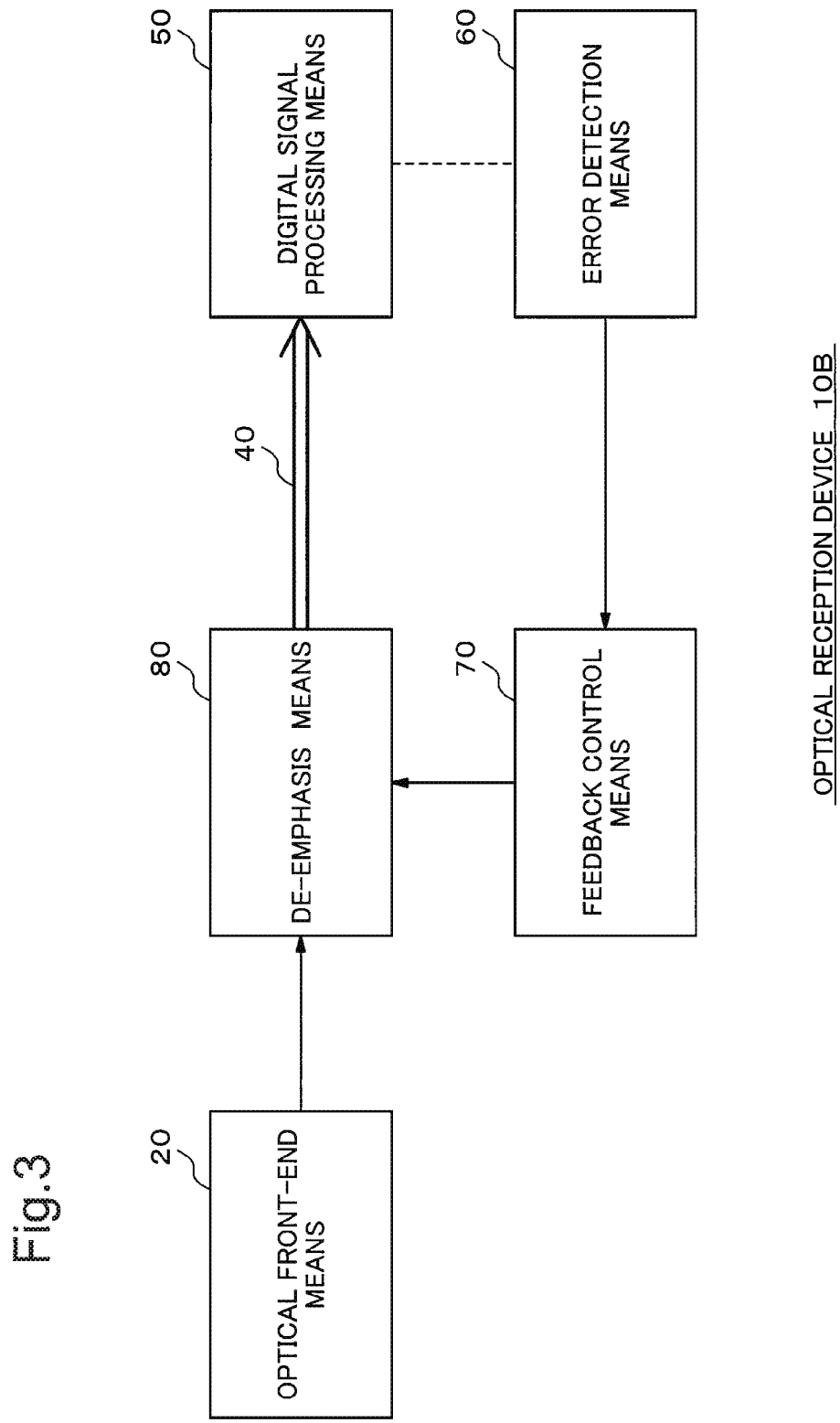
FIG. 3 is a block configuration diagram of another optical reception device 10B according to the first exemplary embodiment.

Here, when the signal intensity is high, a de-emphasis means which reduces a low frequency component may be arranged instead of the pre-emphasis means 30. FIG. 3 shows a block configuration diagram of an optical reception device in that case. The optical reception device 10B of FIG. 3 is configured by arranging a de-emphasis means 80, in place of the pre-emphasis means 30, in the optical reception device 10 of FIG. 1.

The optical reception device 10B of FIG. 3 determines a level of a low frequency component to be removed from an electrical signal demodulated at the optical front-end means 20 (a de-emphasis intensity), on the basis of a signal error detected by the error detection means 60. In a case where an electrical signal processed at the optical front-end means 20 and at the de-emphasis means 80 is inputted to the digital signal processing means 50 via the connection means 40, the optical reception device 10B of FIG. 3 also can correct the output level of the signal at each frequency with high accuracy and easily, and thereby can optimally perform a digital coherent reception process.

Second Exemplary Embodiment

Figure 4:
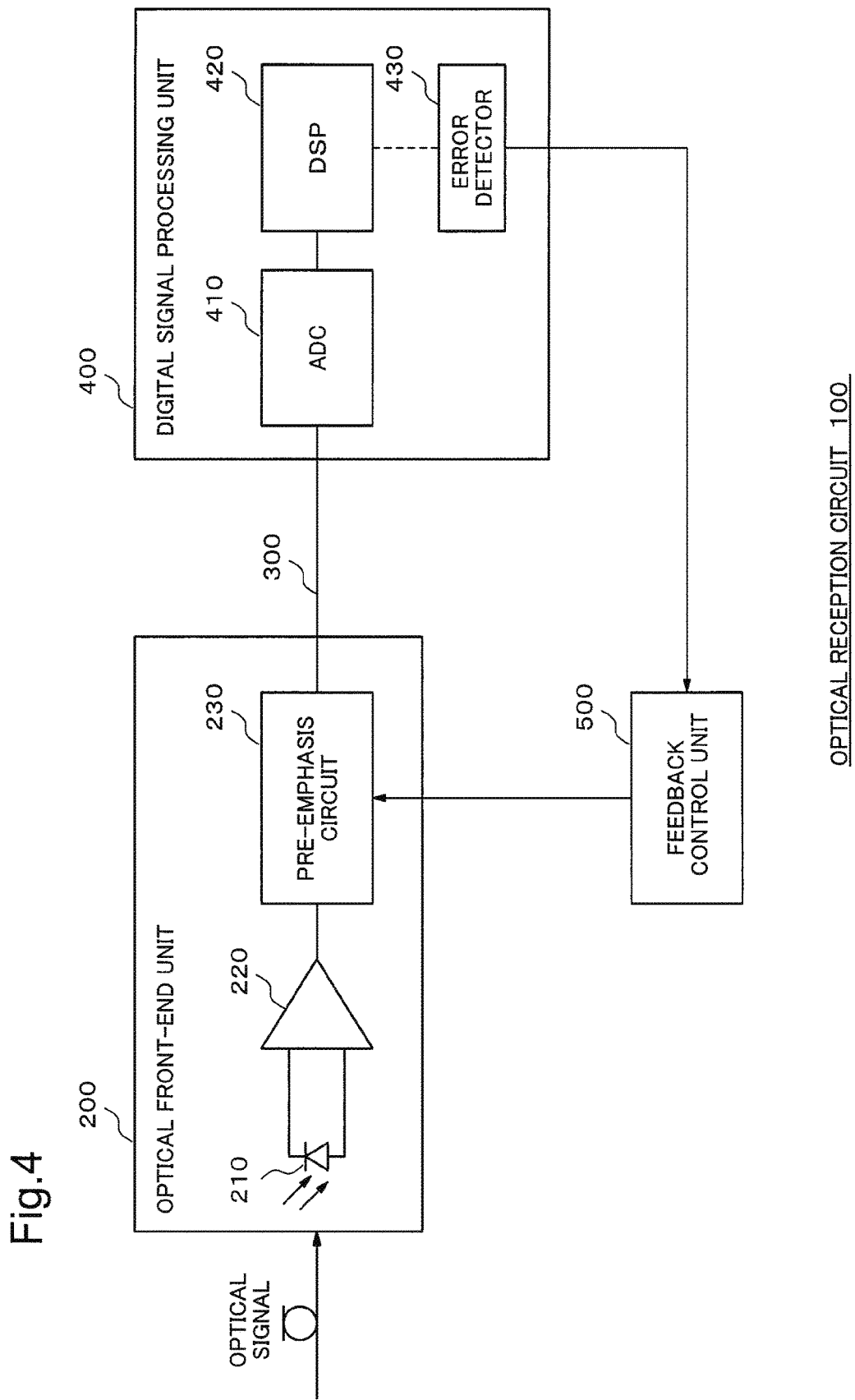
FIG. 4 is a functional block diagram of an optical reception circuit 100 according to a second exemplary embodiment.

A second exemplary embodiment will be described below. FIG. 4 shows a functional block diagram of an optical reception circuit according to the present exemplary embodiment. In FIG. 4, the optical reception circuit 100 comprises an optical front-end unit 200, a connection member 300, a digital signal processing unit 400 and a feedback control unit 500.

The optical front-end unit 200 converts a detected optical signal into an electrical signal and, after adjusting the output to be a desired level at each frequency, outputs the electrical signal to the digital signal processing unit 400 via the connection member 300. The optical front-end unit 200 according to the present exemplary embodiment comprises a PD (Photodiode) 210, a TIA (Trans-impedance Amplifier) 220 and a pre-emphasis circuit 230.

The PD 210 detects an optical signal inputted from the outside, converts the detected optical signal into an electrical signal, and outputs the electrical signal to the TIA 220.

The TIA 220 amplifies the inputted electrical signal and outputs the amplified electrical signal to the pre-emphasis circuit 230.

The pre-emphasis circuit 230 adds a high frequency component to the electrical signal inputted from the TIA 220, on the basis of a control signal inputted from the feedback control unit 500, and outputs the resultant electrical signal. The connection member 300 is composed of connectors, an electrical wiring and the like. The connection member 300 connects the optical front-end unit 200 with the digital signal processing unit 400, and accordingly, an electrical signal outputted from the optical front-end unit 200 is transmitted to the digital signal processing unit 400 via the connection member 300. The connection member 300 functions as a low pass filter, and accordingly, a high frequency component of the electrical signal is attenuated as a result of the electrical signal's propagating through the connection member 300.

The digital signal processing unit 400 performs a digital coherent detection process on the inputted electrical signal. The digital signal processing unit 400 according to the present exemplary embodiment comprises an ADC (analog-to-digital converter) 410, a DSP (digital signal processor) 420 and an error detector 430.

The ADC 410 converts an analog electrical signal inputted from the optical front-end unit 200 via the connection member 300 into a digital electric signal, and outputs the digital electric signal.

The DSP 420 performs a digital coherent reception process on the digital electrical signal inputted from the ADC 410.

The error detector 430 monitors the digital coherent reception process performed at the DSP 420 and thereby detects a signal error in the process. The error detector 430 stores the detected signal error into an internal memory not illustrated in FIG. 4, as a data error amount. Because the error detector 430 detects a signal error in digital processing, it can count a signal error with high accuracy.

Referring to the data error amount stored in the internal memory of the digital signal processing unit 400, the feedback control unit 500 determines the magnitude of a high frequency component to be added to the electrical signal at the pre-emphasis circuit 230 (hereafter, described as a pre-emphasis intensity). The feedback control unit 500 outputs a control signal for setting the determined pre-emphasis intensity, to the pre-emphasis circuit 230.

The feedback control unit 500 according to the present exemplary embodiment varies the pre-emphasis intensity in increasing and decreasing directions from an initial value and, referring to data error amounts detected at that time, sets a pre-emphasis intensity yielding a minimum one of the signal errors to the pre-emphasis circuit 230, as an optimum value in the operation environment.

Figure 5:
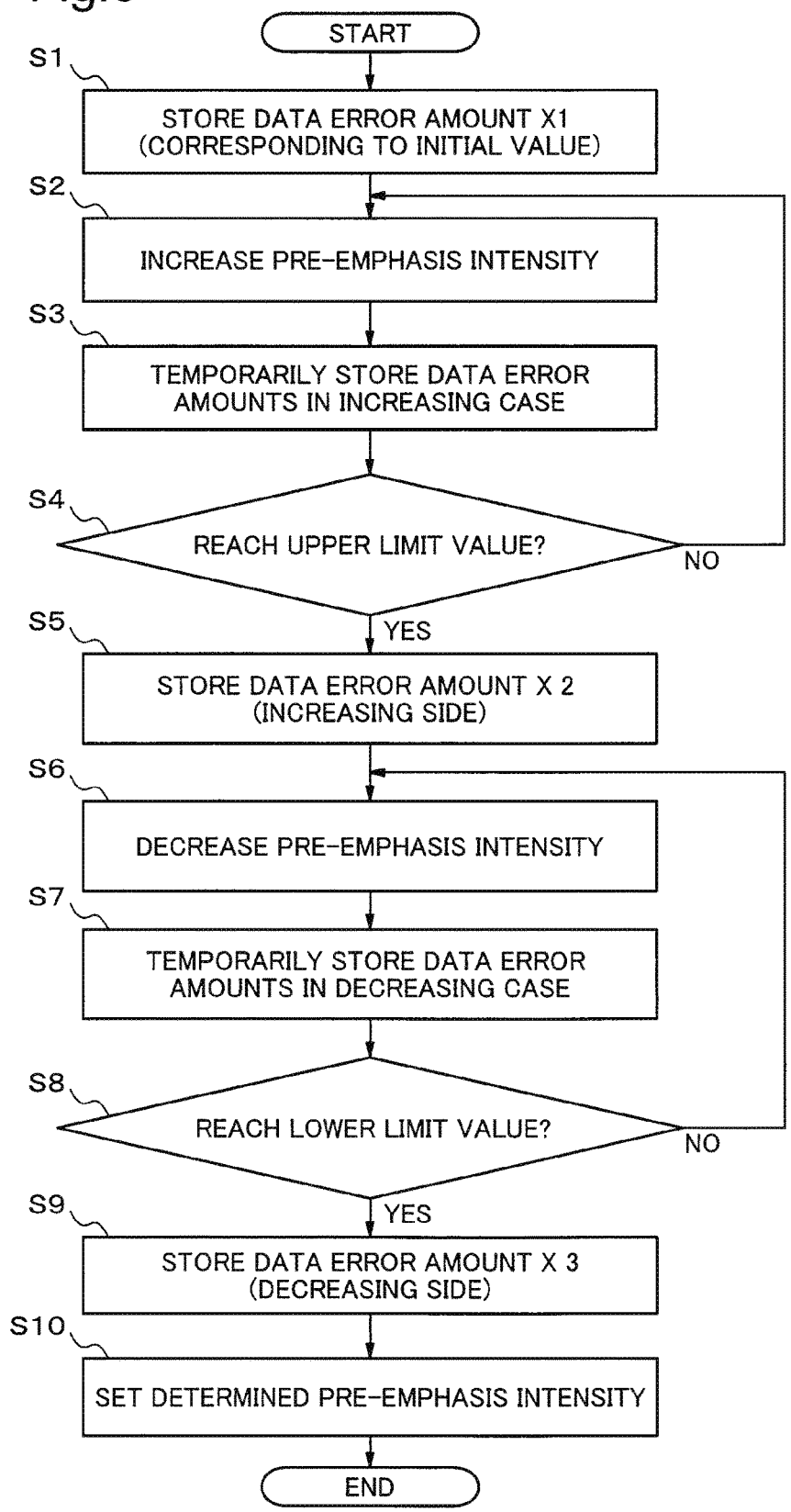
FIG. 5 is an operation flow chart of the optical reception circuit 100 according to the second exemplary embodiment.
Figure 6:
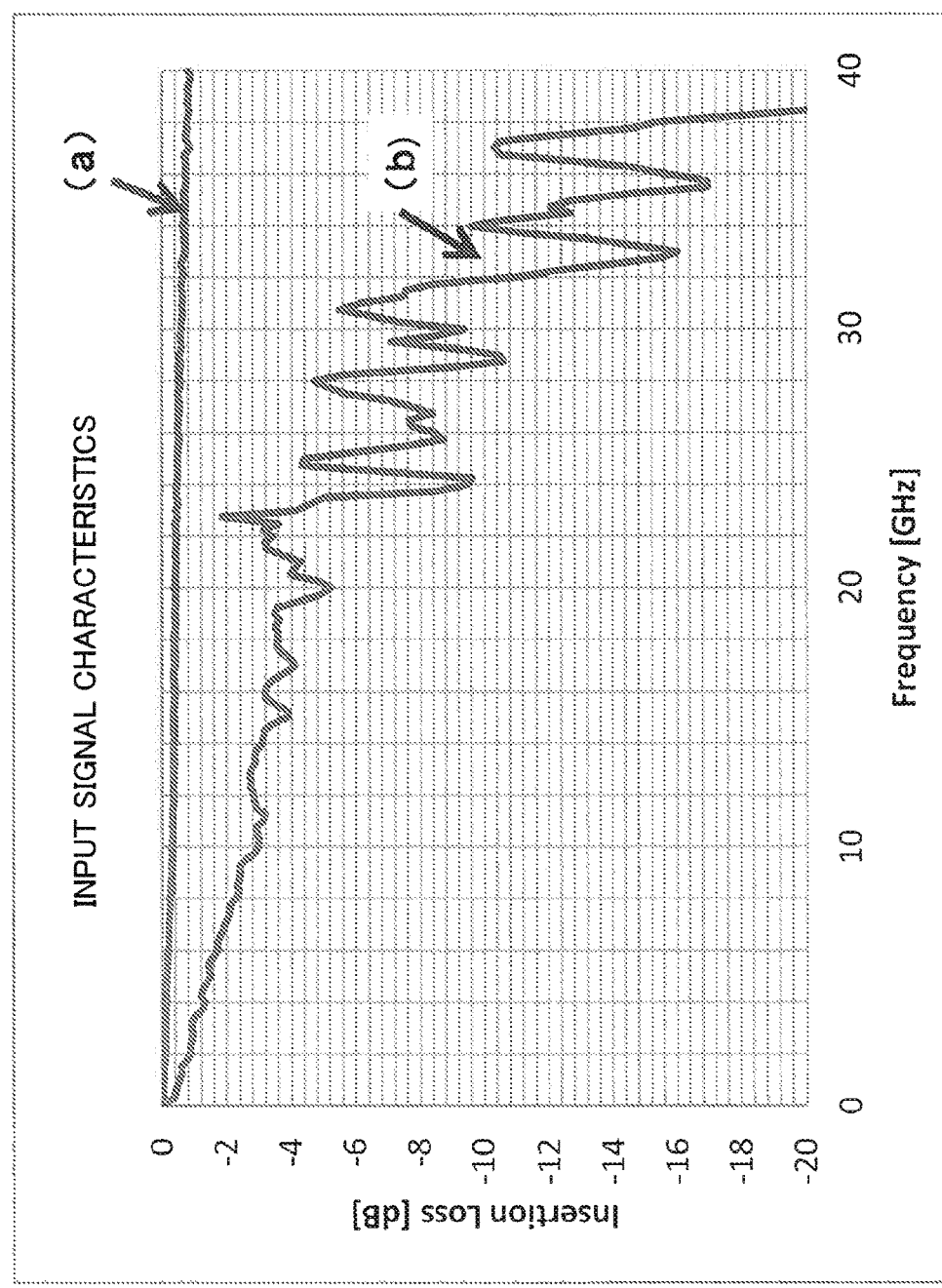
FIG. 6 is an example of input signal characteristics at a digital signal processing unit.

Hereinafter, a description will be given of an operation procedure of the optical reception circuit 100 configured as described above. An operation flow chart of the optical reception circuit 100 is shown in FIG. 5. In FIG. 5, when setting the pre-emphasis intensity of the pre-emphasis circuit 230, the feedback control unit 500 first sets the pre-emphasis intensity of the pre-emphasis circuit 230 at an initial value. The error detector 430 detects a signal error at that time, and stores the detected signal error (a data error amount X1), in a manner to correlate it with the initial value of the pre-emphasis intensity, into the internal memory (S1).

Next, the feedback control unit 500 increases the pre-emphasis intensity it sets to the pre-emphasis circuit 230 from the initial value in steps of a predetermined amount (S2), and the error detector 430 detects signal errors at that time. The error detector 430 temporarily stores the detected signal errors (data error amounts), in a manner to correlate them with respective ones of the pre-emphasis intensities at that time, into the internal memory (S3).

Then, if the pre-emphasis intensity has reached an upper limit value set in advance (YES at S4), the feedback control unit 500 returns the pre-emphasis intensity to the initial value and extracts a minimum data error amount (a data error amount X2) from among the ones stored temporarily into the internal memory in S3, and stores the data error amount X2 into the internal memory, in a manner to correlate it with a pre-emphasis intensity having yielded it (S5).

Next, the feedback control unit 500 decreases the pre-emphasis intensity it sets to the pre-emphasis circuit 230 from the initial value in steps of a predetermined amount (S6), and the error detector 430 detects signal errors at that time. The error detector 430 temporarily stores the detected signal errors (data error amounts), in a manner to correlate them with respective ones of the pre-emphasis intensities at that time, into the internal memory (S7).

Then, if the pre-emphasis intensity has reached a lower limit value set in advance (YES at S8), the feedback control unit 500 extracts a minimum data error amount (a data error amount X3) from among the ones stored temporarily into the internal memory in S7, and stores the data error amount X3 into the internal memory, in a manner to correlate it with a pre-emphasis intensity having yielded it (S9).

The feedback control unit 500 compares the data error amounts X1, X2 and X3 stored in the internal memory of the digital signal processing unit 400, and thereby sets a pre-emphasis intensity correlated with the minimum one of the data error amounts to the pre-emphasis circuit 230, as an optimum value in the operation environment (510).

As has been described above, in the optical reception circuit 100 according to the present exemplary embodiment, by only varying the pre-emphasis intensity set to the pre-emphasis circuit 230 in increasing and decreasing directions from an initial value, and thereby acquiring a pre-emphasis intensity having yielded a minimum signal error, the feedback control unit 500 can set easily and automatically an optimum value of the pre-emphasis intensity in the operation environment to the pre-emphasis circuit 230. Here, because the error detector 430 detects a signal error in a digital coherent reception process performed on a digital electrical signal, it can count a signal error with high accuracy.

Accordingly, even in a case where the optical front-end unit 200 is added, after its formation, to the digital signal processing unit 400 by means of the connection member 300, the optical reception circuit 100 according to the present exemplary embodiment can compensate for attenuation of a high frequency component of a signal with high accuracy and easily, and consequently can perform a highly accurate digital coherent reception process at the digital signal processing unit 400.

Here, the technology of Patent Literature 1 described in Background Art monitors the power, at each wavelength, of an optical signal transmitted from a transmission station, at a spectral monitor, and controls a pre-emphasis amount at the transmission station according to the monitoring result. However, there should be a limit of accuracy in such a case of using the power of an optical signal at each wavelength, and accordingly, it is difficult to apply it, as it is, to compensation of high frequency component attenuation at an ultra-short distance connection between an optical front-end unit and a digital signal processing unit.

The technology of Patent Literature 2 calculates a frequency characteristic by performing the inverse Fourier transform of data of an equal error rate curve, and controls the gain of an AGC (Automatic Gain Control) amplifier in a manner to cancel out the frequency characteristic. However, in such a case of controlling the gain of an amplifier by acquiring an equal error rate curve and then performing the inverse Fourier transform, the control becomes complicated.

In contrast to them, the optical reception device according to the present invention determines the magnitude of a high frequency component to be added to an electrical signal demodulated at the optical front-end means (a pre-emphasis intensity) on the basis of signal errors detected by the error detection means. Because the signal error detection at the error detection means is performed on signal errors in a digital coherent reception process, it becomes possible to count a signal error with high accuracy and consequently to control the pre-emphasis means with high accuracy. Further, in the case of varying the pre-emphasis intensity in increasing and decreasing directions and thereby setting a pre-emphasis intensity having yielded a minimum signal error to the pre-emphasis means, no complicated process is needed.

As a result, even in the case where an electrical signal processed at the optical front-end means and at the pre-emphasis means is inputted to the digital signal processing means via the connection means, the optical reception device according to the present exemplary embodiment can compensate for attenuation of a high frequency component of the signal with high accuracy and easily, and thereby can optimally perform a digital coherent reception process.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. An optical reception device comprising:
an optical front-end means for demodulating an inputted optical signal, converting the demodulated signal into an electrical signal and outputting the electrical signal;
a pre-emphasis means for adding a high frequency component to the electrical signal;
a digital signal processing means for receiving input of the electrical signal with the high frequency component added thereto via a transmission wire, and for performing a digital coherent reception process on the inputted electrical signal;
an error detection means for detecting a signal error in the digital coherent reception process; and
a feedback control means for controlling the pre-emphasis means by:
setting a level of the high frequency component at an initial value;
varying the level of the high frequency component in increasing and decreasing directions from the initial value; and
determining a first level of the high frequency component corresponding to a minimum signal error.

2. The optical reception device according to claim 1, wherein the optical front-end means is attachable to and detachable from the optical reception device.

3. The optical reception device according to claim 1, wherein the digital signal processing means comprises an analog-to-digital conversion circuit for converting the inputted electrical signal into a digital electrical signal, and a digital signal processor for performing the digital coherent reception process on the digital electrical signal.

4. The optical reception device according to claim 1, wherein the optical front-end means comprises a photodetector for detecting an optical signal and converting the detected optical signal into an electrical signal, and a transimpedance amplifier for amplifying the converted electrical signal.

5. An optical reception device, comprising:
an optical front-end means for demodulating an inputted optical signal, converting the demodulated signal into an electrical signal and outputting the electrical signal;
a de-emphasis means for removing a low frequency component from the electrical signal;
a digital signal processing means for receiving input of the electrical signal with the high frequency component added thereto via a transmission wire, and for performing a digital coherent reception process on the inputted electrical signal;
an error detection means for detecting a signal error in the digital coherent reception process; and
a feedback control means for controlling the de-emphasis means by:
varying a level of the low frequency component in accordance with the signal errors detected; and
determining a first level of the low frequency component corresponding to a minimal signal error.

6. An optical reception method, comprising:
demodulating an inputted optical signal;
converting the demodulated signal into an electrical signal;
removing a predetermined low frequency component from the electrical signal;
transmitting the electrical signal with the low frequency component removed therefrom, through a transmission wire;
performing a digital coherent reception process on the transmitted electrical signal;
detecting a signal error in the digital coherent reception process;
varying a level of the low frequency component in accordance with the signal errors detected; and
determining a first level of the low frequency component corresponding to a minimal signal error.

7. An optical reception method, comprising:
demodulating an inputted optical signal;
converting the demodulated signal into an electrical signal;
adding a high frequency component to the electrical signal;
transmitting the electrical signal with the high frequency component added thereto, through a transmission wire;
performing a digital coherent reception process on the transmitted electrical signal;
detecting a signal error in the digital coherent reception process; and
controlling the high frequency component by:
setting a level of the high frequency component at an initial value;
varying the level of the high frequency component in increasing and decreasing directions from the initial value; and
determining a first level of the high frequency component corresponding to a minimum signal error.

8. The optical reception method according to claim 7, further comprising:
converting the transmitted electrical signal into a digital electrical signal; and
performing the digital coherent reception process on the digital electrical signal.

9. The optical reception method according to claim 7, further comprising:
detecting an optical signal;
converting the detected optical signal into an electrical signal; and
amplifying the converted electrical signal.

* * * * *